US012799013B2

United States Patent
Joo et al.

(10) Patent No.: US 12,799,013 B2
(45) Date of Patent: Nov. 17, 2026

(54) SLUDGE TREATMENT PROCESS

(71) Applicant: LG Chem, Ltd., Seoul (KR)

(72) Inventors: Bonsik Joo, Daejeon (KR); Hyun Woog Ryu, Daejeon (KR); Manki Cho, Daejeon (KR); Jeong Kyu Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 439 days.

(21) Appl. No.: 18/021,639

(22) PCT Filed: Apr. 29, 2022

(86) PCT No.: PCT/KR2022/006193

§ 371 (c)(1),
(2) Date: Feb. 16, 2023

(87) PCT Pub. No.: WO2022/231384

PCT Pub. Date: Nov. 3, 2022

(65) Prior Publication Data

US 2023/0303417 A1 Sep. 28, 2023

(30) Foreign Application Priority Data

Apr. 30, 2021 (KR) ........................ 10-2021-0056222

(51) Int. Cl.
*C02F 11/13* (2019.01)
*C02F 11/10* (2006.01)

(52) U.S. Cl.
CPC .............. *C02F 11/13* (2019.01); *C02F 11/10* (2013.01); *C02F 2303/24* (2013.01); *C02F 2303/26* (2013.01)

(58) Field of Classification Search
CPC ...... C02F 11/13; C02F 11/10; C02F 2303/24; C02F 2303/26
See application file for complete search history.

(56) References Cited

FOREIGN PATENT DOCUMENTS

| | | | | | |
|---|---|---|---|---|---|
| CN | 101813316 | A | | 8/2010 | |
| CN | 104741362 | A | | 7/2015 | |
| CN | 105601075 | A | | 5/2016 | |
| CN | 110883050 | A | | 3/2020 | |
| CN | 111662731 | A | | 9/2020 | |
| JP | H09-196335 | A | | 7/1997 | |
| JP | 2000080386 | A | * | 3/2000 | ................ C10L 5/46 |
| JP | 2001198562 | A | | 7/2001 | |
| JP | 2004209314 | A | | 7/2004 | |
| JP | 3659901 | B2 | | 6/2005 | |
| JP | 2007270018 | A | | 10/2007 | |

(Continued)

OTHER PUBLICATIONS

JP-2000080386-A_English translation (Year: 2000).*

(Continued)

*Primary Examiner* — Youngsul Jeong
(74) *Attorney, Agent, or Firm* — Lerner David LLP

(57) ABSTRACT

A sludge treatment process including: adjusting sludge to a particle diameter of more than 2 mm to 45 mm or less; a step of pyrolyzing the adjusted sludge in a low-oxygen or oxygen-free atmosphere and at a temperature of 350° C. to 500° C.; and a step of combusting a gas generated in the pyrolysis. Such process may be used to decompose harmful compounds and maximize the efficiency of the process.

11 Claims, 1 Drawing Sheet

(56) References Cited

FOREIGN PATENT DOCUMENTS

| | | | | | |
|---|---|---|---|---|---|
| JP | 4083188 | B2 | | 4/2008 | |
| JP | 2008248161 | A | | 10/2008 | |
| JP | 4382470 | B2 | | 12/2009 | |
| JP | 5379957 | B2 | | 12/2013 | |
| JP | 5671723 | B2 | | 2/2015 | |
| JP | 5892832 | B2 | | 3/2016 | |
| KR | 100775568 | B1 | | 11/2007 | |
| KR | 10-2011-0100022 | A | * | 9/2011 | ................ C10J 3/20 |
| KR | 20110100022 | A | | 9/2011 | |
| KR | 20110129845 | A | | 12/2011 | |
| KR | 101176427 | B1 | * | 8/2012 | ................ F26B 3/04 |
| KR | 20140039647 | A | | 4/2014 | |
| KR | 101785558 | B1 | | 10/2017 | |
| KR | 20220029067 | A | | 3/2022 | |
| WO | 2018155955 | A1 | | 8/2018 | |

OTHER PUBLICATIONS

KR10-2011-0100022-A_English translation (Year: 2011).*
KR-101176427-B1_English translation (Year: 2012).*
International Search Report for PCT/KR2022/006193 mailed Aug. 8, 2022. 3 pgs.
800 Sewerage Facility Standards, Korea water supply and drainage association, the environment division enactment drainage system standard, (2011 Korea), 17 pgs.

* cited by examiner

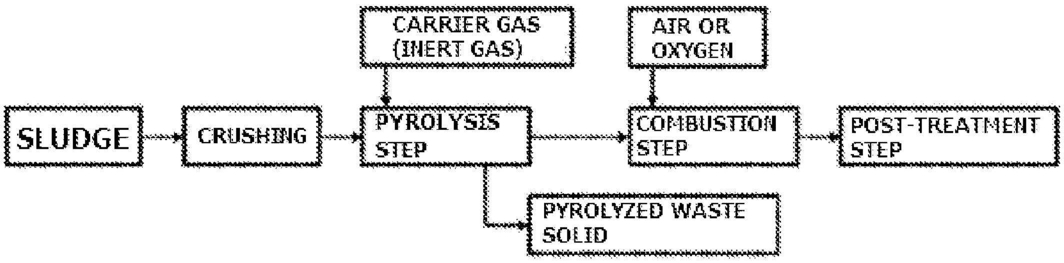
CARRIER GAS
(INERT GAS)
AIR OR
OXYGEN
SLUDGE
CRUSHING
PYROLYSIS
STEP
COMBUSTION
STEP
POST-TREATMENT
STEP
PYROLYZED WASTE
SOLID

SLUDGE TREATMENT PROCESS

CROSS-REFERENCE TO RELATED APPLICATIONS

The present application is a national phase entry under 35 U.S.C. § 371 of international Application No. PCT/KR2022/006193 filed on Apr. 29, 2022, which claims priority from Korean Patent Application No. 10-2021-0056222 filed on Apr. 30, 2021, all disclosures of which are incorporated herein by reference.

TECHNICAL FIELD

The present disclosure relates to a sludge treatment process, and more specifically, to a treatment process capable of minimizing the amount of harmful compounds discharged during the sludge treatment process.

BACKGROUND ART

As modern society becomes more sophisticated, various types of products are being developed and produced. In the production process of a product, such as a chemical process, not only the product but also a large amount of industrial sludge are produced. Further, products that are produced and sold are also recovered as waste after the products have reached the end of their useful life. Therefore, the amount of waste generated every year in the modern society where many products are produced and discarded is considerable, and in particular, the waste contains compounds harmful to the human body in many cases. Thus, it is desirable to properly treat and discharge waste containing harmful compounds.

For example, harmful chlorine compounds may be produced as unwanted by-products in various product production processes such as chemical processes, pulp processes, and incineration processes. Although these harmful chlorine compounds are subjected to various treatment processes, a considerable amount of these harmful chlorine compounds may be released into soil, water and the atmosphere.

Examples of a waste treatment method widely known as a waste treatment method include incineration, landfill, plasma treatment, high-temperature base reaction, subcritical water treatment, and the like.

Although incineration is a generally preferred method because it is possible to significantly reduce the volume of waste and recover some of the energy used, harmful compounds may not be smoothly removed at the step of incineration or may be re-synthesized thereafter, and the harmful compounds are vaporized and released into the atmosphere, thereby polluting the atmosphere. In particular, incineration has a problem in that the higher standards cannot be easily satisfied as the social demand for air protection has been recently increased. Although landfill is a method which is frequently used because this method is easy, there is a problem in that harmful compounds are thermochemically stable, and consequently, are not decomposed and pollute the soil when put into the landfill, or are well dissolved in fats and the like and thus are accumulated in living organisms to adversely affect the food chain, and eventually may flow into the human body.

Plasma treatment, high-temperature base reaction, subcritical water treatment, and the like also have problems in that a high concentration of harmful compounds cannot be treated, the cost for equipment operation is high, and decomposed harmful compounds are re-synthesized. In addition, although examples of a method of removing harmful compounds also include a method of using activated carbon adsorption, a bag filter, scrubbing, and the like in the terminal process, the method has problems in that since the harmful compounds are physically removed instead of being decomposed, the total amount of the harmful compounds is not significantly changed and the efficiency of removing the harmful compounds is also low.

Therefore, there is a need for studies on a treatment process capable of chemically decomposing harmful compounds as much as possible, suppressing the re-synthesis of harmful compounds, and being easily performed without the need of using complicated equipment.

DETAILED DESCRIPTION OF THE INVENTION

Technical Problem

The present disclosure has been made in an effort to solve the problems in the related art, and is intended to provide a sludge treatment process capable of completely decomposing harmful compounds and maximizing the efficiency of removing the harmful compounds by suppressing re-synthesis of the harmful compounds.

Technical Solution

An exemplary embodiment of the present disclosure provides a sludge treatment process including:

adjusting a sludge to a particle diameter of more than 2 mm and 45 mm or less;

a pyrolysis step of pyrolyzing the sludge in a low-oxygen or oxygen-free atmosphere and at a temperature of 350° C. to 500° C.; and a combustion step of burning a gas generated in the pyrolysis step.

According to an exemplary embodiment, the adjusting of the sludge to the particle diameter of more than 2 mm and 45 mm or less includes crushing or pulverizing the sludge.

According to still another exemplary embodiment, the adjusting of the sludge to the particle diameter of more than 2 mm and 45 mm or less includes drying the sludge.

According to yet another exemplary embodiment of the present disclosure, the sludge includes a harmful chlorine component at a concentration of 1,000 ppm to 20,000 ppm.

Advantageous Effects

According to the sludge treatment process according to exemplary embodiments of the present disclosure, toxic materials such as harmful chlorine compounds can be efficiently decomposed, and simultaneously, the process time and energy can be saved in the entire process. Specifically, the pyrolysis and combustion steps can allow harmful compounds such as chlorine compounds in the sludge to be completely decomposed, and simultaneously adjust the particle diameter of sludge to more than 2 mm and 45 mm or less before the pyrolysis, thereby increasing the energy efficiency and shortening the process time.

BRIEF DESCRIPTION OF DRAWINGS

The FIGURE is a schematic view of the sequence of the sludge treatment process according to an exemplary embodiment of the present disclosure.

DETAILED DESCRIPTION

Hereinafter, the present disclosure will be described in more detail.

Terms or words used in the specification and the claims should not be interpreted as being limited to typical or dictionary meanings and should be interpreted with a meaning and a concept that are consistent with the technical spirit of the present disclosure based on the principle that an inventor can appropriately define a concept of a term in order to describe his/her own disclosure in the best way.

An exemplary embodiment of the present disclosure provides a sludge treatment process including:

adjusting a sludge to a particle diameter of 45 mm or less;

a pyrolysis step of pyrolyzing the sludge in a low-oxygen or oxygen-free atmosphere and at a temperature of 350° C. to 500° C.; and a combustion step of combustion gas generated in the pyrolysis step.

In an exemplary embodiment of the present disclosure, the sludge is waste obtained in the chemical process field, and may have a state in which solid particles and moisture generated during the process are mixed. Specifically, the waste to be treated in the present disclosure may include a solid precipitate produced while treating waste liquid and waste water generated during a process of preparing ethylene dichloride, a vinyl chloride monomer, and the like from ethylene. Furthermore, the waste may include harmful chlorine components such as polychlorinated biphenyl, polychlorinated dibenzo-p-dioxin, polychlorinated dibenzofuran, and chlorophenol at a concentration of approximately 1,000 ppm to 20,000 ppm. Here, the concentration of the harmful chlorine components means a concentration of all chlorine present in the sludge, and may be measured using ion chromatography (IC).

In particular, in a sludge including a high concentration of harmful chlorine components as described above, the particle diameter of a sludge to be described below may affect the efficiency in the pyrolysis and combustion steps. For example, the toxicity of general waste is 1,000 pg I-TEQ/g or less, and most of the toxicities are 100 pg I-TEQ/g or less, and the low toxicity as described above is relatively easily removed by various methods. In contrast, highly toxic waste, for example, waste of 30,000 pg I-TEQ/g or more is not easily removed by a general method. In the present disclosure, in the highly toxic waste, toxicity may be efficiently removed by adjusting the particle diameter of sludge together with the pyrolysis and combustion steps to be described below. In the present specification, the toxicity concentration (pg I-TEQ/g) is a value derived as a sum of the product of the concentrations of 17 congeners of polychlorinated dibenzodioxin (PCDD) and polychlorinated dibenzofuran (PCDF) having toxicity and the international toxicity equivalency factor (I-TEF).

| Dioxins | | Toxicity equivalency factor (NATO, I-TEF) |
|---|---|---|
| PCDD | 2, 3, 7, 8-TCDD | 1 |
| | 1, 2, 3, 7, 8-PeCDD | 0.5 |
| | 1, 2, 3, 4, 7, 8-HxCDD | 0.1 |
| | 1, 2, 3, 6, 7, 8-HxCDD | 0.1 |
| | 1, 2, 3, 7, 8, 9-HxCDD | 0.1 |
| | 1, 2, 3, 4, 6, 7, 8-HpCDD | 0.01 |
| | 1, 2, 3, 4, 6, 7, 8, 9-OCDD | 0.001 |

-continued

| Dioxins | | Toxicity equivalency factor (NATO, I-TEF) |
|---|---|---|
| PCDF | 2, 3, 7, 8-TCDF | 0.1 |
| | 1, 2, 3, 7, 8-PeCDF | 0.05 |
| | 2, 3, 4, 7, 8-PeCDF | 0.5 |
| | 1, 2, 3, 4, 7, 8-HxCDF | 0.1 |
| | 1, 2, 3, 6, 7, 8-HxCDF | 0.1 |
| | 1, 2, 3, 7, 8, 9-HxCDF | 0.1 |
| | 2, 3, 4, 6, 7, 8-HxCDF | 0.1 |
| | 1, 2, 3, 4, 6, 7, 8-HpCDF | 0.01 |
| | 1, 2, 3, 4, 7, 8, 9-HpCDF | 0.01 |
| | 1, 2, 3, 4, 6, 7, 8, 9-OCDF | 0.001 |

$$\text{International toxicity equivalency quantity (I-TEQ)} = \Sigma(\text{PCDD}i \times \text{I-TEF}i) + \Sigma(\text{PCDF}i \times \text{I-TEF}i)$$ <Equation>

In the equation, i means the number of chlorine in a toxic compound.

The waste may include organic materials and inorganic materials at 3:7 to 7:3, specifically 4:6 to 6:4, for example 1:1 on a weight basis.

Hereinafter, the treatment process according to exemplary embodiments of the present disclosure will be described for each step.

Dehydration Step (S0)

According to an exemplary embodiment of the present disclosure, a step of dehydrating the sludge is further included before the adjusting of the sludge to a particle diameter of 45 mm or less. For example, a waste water sludge may be dehydrated so as to have a moisture content of 30 wt % to 70 wt %, preferably 50 wt % to 70 wt %, and more preferably 50 wt % to 60 wt %. A method required for dehydration may be adopted, and, for example, a semi-solid material with a moisture content of 50 wt % to 60 wt % may be recovered using a filter press or a decanter.

Particle Diameter Adjustment Step (S1)

The sludge treatment process according to the exemplary embodiment of the present disclosure includes adjusting the sludge to a particle diameter of 45 mm or less, more than 2 mm and 45 mm or less, and furthermore, 4 mm or more and 45 mm or less. When the particle diameter of sludge is adjusted to 45 mm or less, the efficiency of removing harmful chlorine compounds may be maximized in the pyrolysis step and combustion step to be described below, and when the harmful chlorine compounds are pyrolyzed and then discharged onto the gas phase, the amount of harmful chlorine compounds discharged may be extremely reduced.

Specifically, when sludge is prepared into particles having a particle diameter of 45 mm or less, the sludge may be controlled such that the sludge has a relatively low moisture content compared to the state of the sludge form waste as it is, and the sludge may be controlled such that the moisture content is easily controlled and a desired moisture content is obtained, so that it is advantageous for heat transfer to harmful compounds that need to be decomposed during the pyrolysis and combustion steps. Further, specifically, based on the same mass, the waste in the form of particles may have a larger surface area than the waste in the form of sludge, and such a large surface area may become a factor for smooth heat transfer, thereby further enhancing the efficiency of subsequent pyrolysis and combustion steps.

The particle diameter may be measured by a method capable of measuring the particle size of a solid, for example, by a laser diffraction/scattering method, a particle size analysis using an electron microscope, or the like, but the measurement method is not limited to these methods.

According to an exemplary embodiment, the particle diameter of the sludge is preferably 0.5 mm or more and 45 mm or less, and more preferably more than 2 mm and 45 mm or less. If necessary, the particle diameter of the sludge may be adjusted to 3 mm to 45 mm, and the particle diameter of the sludge may be adjusted to 4 mm to 45 mm, or 6 mm to 45 mm.

The exemplary embodiment of the present disclosure is characterized in that when the particle diameter of sludge is adjusted, a reference for the upper limit of the particle diameter is set to 45 mm, and in this case, the time taken for the crushing or pulverizing and classification steps is reduced, and energy saving can be realized, compared to relatively further reducing a reference for the upper limit of the particle diameter. In addition, when the particle diameter of the sludge is adjusted, fine particles, for example, particles having a particle diameter of less than 0.5 mm may be generated in a smaller amount in the case where the reference for the upper limit of the particle diameter is set to 45 mm compared to the case where the reference for the upper limit of the particle diameter is further reduced, so that the amount of dust generated is reduced. Therefore, there is an effect of reducing the time and cost required for maintaining the working environment and maintaining and repairing the equipment. Furthermore, when the particle diameter of the sludge is adjusted to more than 2 mm and 45 mm or less, the efficiency of removing harmful compounds is at the same level as adjusting the particle diameter of the sludge to 2 mm or less.

When too small particles are present in the sludge, the gas flow may cause dust to be blown off during the pyrolysis or combustion step, and during the process, there may be a problem in that harmful compounds are adsorbed on dust, and thus are not treated. Further, when sludge with a too small particle diameter is included, the sludge may be discharged to the atmosphere, so that problems such as increased investment costs for post-treatment processes such as a bag filter, and increased costs and time for maintenance and repair may occur. According to the exemplary embodiments, the aforementioned problems may be prevented by adjusting the particle diameter of sludge to 0.5 mm or more, preferably more than 2 mm.

According to an exemplary embodiment, the adjusting of the sludge to the particle diameter of 45 mm or less may include crushing or pulverizing the sludge. When waste in the form of sludge is crushed or pulverized to prepare the waste in form of particles, by controlling the particles of waste relatively uniformly, it is possible to minimize the interference with heat transfer to harmful compounds due to the non-uniform particle size in the sludge. The crushing or pulverizing of the sludge is not particularly limited as long as the particle diameter can be adjusted within the above range. For example, the crushing or pulverizing may be performed using a general crusher or a pulverizer, and specifically, a jaw crusher or the like may be used.

According to another exemplary embodiment, the adjusting of the sludge to the particle diameter of 45 mm or less may include drying the sludge. In the drying of the sludge as described above, the particle diameter may be adjusted to the above-described range according to the drying conditions. The drying conditions are not particularly limited as long as the particle diameter can be adjusted within the above range, and the description of a drying step (S2) to be described below may be applied to the drying method and the degree of drying.

According to still another exemplary embodiment, the adjusting of the sludge to the particle diameter of 45 mm or less may include drying the sludge and crushing or pulverizing the sludge before, during or after drying the sludge. This exemplary embodiment include both the drying step and the crushing or pulverizing step. The above-described description may be applied to drying, crushing and pulverization.

According to yet another exemplary embodiment, the adjusting of the sludge to a particle diameter of 45 mm or less may include a classification step of separating particles having a particle diameter of 45 mm or less. When particles having a specific particle diameter are formed through the above-described dehydration step, crushing/pulverizing step and/or drying step, particles having a particle diameter of 45 mm or less may be separated through the classification step. As the classification step, those publicly known as a method of separating particles according to size may be used, and a method using a sieve may be used. When the particle diameter is adjusted to more than 2 mm, a method of separating fine particles having a particle diameter of 2 mm or less from the entire sludge through the classification step may be used.

When particles having a particle diameter of more than 45 mm are separated through the classification step, the particles are subjected to the classification step, and then may be subjected to pyrolysis and combustion steps to be described below, after the particle diameter is adjusted by again crushing/pulverizing and/or drying the particles. When the exemplary embodiments are performed in this manner, the economic feasibility of the overall process may be improved.

Drying Step (S2)

The treatment process of the sludge according to an exemplary embodiment of the present disclosure may further include drying the sludge before or after the adjusting of the sludge to a particle diameter of 45 mm or less.

The drying of the sludge may be performed such that the moisture content of the sludge is 20 wt % or less. When the sludge has such a moisture content, the efficiency of removing harmful compounds and the efficiency of energy may be enhanced in the pyrolysis step and the combustion step to be described below. After the drying step, the moisture content of the sludge may be preferably 10 wt % or less, and more preferably 5 wt % or less.

The drying step may be performed by a method, a condition and a time so as to satisfy the aforementioned moisture content range, and is not particularly limited. For example, the drying step may be performed by leaving the sludge to stand until the above-described moisture content is satisfied at a temperature which is higher than room temperature and lower than the temperature of the pyrolysis step.

The adjustment of the above-described drying temperature and the adjustment of the moisture content may be performed using a publicly-known method, and may be performed using a general device used for drying.

Pyrolysis Step (S3)

According to an exemplary embodiment of the present disclosure, a pyrolysis step (S3) of pyrolyzing the sludge in a low-oxygen or oxygen-free atmosphere and at a temperature of 350° C. to 500° C. is performed.

In this case, the drying step can be shortened and omitted by adjusting the total time of the pyrolysis step and the moisture content of the inflowing sludge. When the drying process is omitted, the moisture content of the inflowing sludge may be 60 wt % or less, 55 wt % or less, 50 wt % or less, or 40 wt % or less, more precisely 30 wt % or less, and even more precisely 25 wt % or less. When the drying process is omitted, the amount of gas discharged during the pyrolysis step may be increased, and in some cases, the heat treatment time may be additionally increased for smooth discharge of the produced gas, and specifically, the heat treatment time may be increased within up to 24 hours, more precisely up to 12 hours.

The sludge to be subjected to the pyrolysis step (S3) may be sludge that has undergone the above-described particle diameter adjustment step (S1) or sludge that has undergone the above-described drying step (S2).

Sludge that has undergone the above pyrolysis may have a moisture content of less than 5 wt %. After the pyrolysis step, the moisture content of sludge may be preferably 4 wt % or less, more preferably 3 wt % or less, 0.01 wt % or more, preferably 0.05 wt % or more, and more preferably 0.1 wt % or more.

The pyrolysis step is performed in a low-oxygen or oxygen-free atmosphere. In the present specification, the oxygen-free atmosphere means an atmosphere in which oxygen is substantially absent among the gases that create the atmosphere. The pyrolysis step is preferably performed in an atmosphere with an oxygen concentration of 3 vol % or less, preferably 1 vol % or less, and may be performed in an atmosphere in which oxygen is completely absent, that is, the oxygen concentration is 0 vol %.

When the pyrolysis step is performed in a low-oxygen or oxygen-free atmosphere, at a temperature of 350° C. to 500° C. and under low-oxygen or oxygen-free conditions, the partial and complete decomposition of a harmful chlorine compound may occur smoothly along with a dechlorination reaction in which the C—Cl bond of the harmful chlorine compound in the sludge is broken. In contrast, under the condition where oxygen is present in excess of 3 vol %, there may occur a problem in that oxygen reacts with an organic material and a harmful chlorine compound in sludge to form another harmful chlorine compound, or decomposed harmful chlorine compounds are re-synthesized.

The low-oxygen or oxygen-free atmosphere does not limit a specific gas and may be, for example, a nitrogen atmosphere, an inert atmosphere or a vacuum atmosphere. As the inert atmosphere, an argon atmosphere or a helium atmosphere may be used, but the inert atmosphere is not limited thereto. Among them, particularly when a nitrogen atmosphere is applied as a low-oxygen or oxygen-free atmosphere, there is an advantage in that the atmosphere is economical and the atmosphere is easily created because relatively cheap nitrogen can be used. The low-oxygen or oxygen-free atmosphere may be adjusted by introducing a carrier gas into a pyrolysis apparatus used in the pyrolysis step.

The temperature condition of the pyrolysis step may be 350° C. to 500° C., preferably 350° C. to 450° C. When the temperature of the pyrolysis step is within the above-described range, the final removal rate of harmful compounds may be further increased from the viewpoint of cooperation with a combustion step to be described below. In particular, when the temperature of the pyrolysis step is lower than the above-described range, harmful compounds may not be sufficiently removed, and when the temperature of the pyrolysis step is higher than the above-described range, the efficiency of removing harmful chlorine compounds is hardly improved, whereas only the amount of energy used is significantly increased, so that the economic feasibility of the entire process may deteriorate.

The time for which the pyrolysis step is performed may be 1 to 6 hours, preferably 2 to 6 hours, and more preferably 3 to 5 hours. When the time for which the pyrolysis step is performed is too short, harmful compounds may not be sufficiently pyrolyzed, and when the time for which the pyrolysis step is performed is too long, the effect of increasing the removal rate of harmful compounds is insignificant, compared to the increase in amount of energy used.

Combustion Step (S4)

In the pyrolysis step, harmful compounds in the sludge are decomposed to form a gas, and some of the formed gas components may still be harmful. Therefore, harmful compounds in a gas state need to be additionally burnt and removed. The gas phase harmful compounds remaining through combustion in this step may be converted to harmless small molecule compounds such as carbon dioxide or water.

In the combustion step, it is desirable to introduce air or oxygen together in addition to the gas generated in the above-described pyrolysis step.

According to an exemplary embodiment, the temperature in the combustion step may be 900° C. to 1,200° C., preferably 1,000° C. to 1,200° C. When the temperature in the combustion step is lower than the lower limit of the above range, the remaining gas phase harmful compounds may not be sufficiently oxidized, and when the temperature is higher than the upper limit of the above range, the amount of energy used for combustion is excessive, so that the economic feasibility of the overall treatment process may deteriorate.

The time for the combustion step may be 5 minutes to 60 minutes, preferably 15 minutes to 30 minutes. When the time for the combustion step is too short, the harmful compounds may not be sufficiently oxidized, and when the time is too long, the amount of energy used for combustion is excessive as in the case of temperature, so that the economic feasibility of the overall treatment process may deteriorate.

Cooling Step (S5)

The sludge treatment process according to another exemplary embodiment of the present disclosure may further include a step (S5) of cooling the combustion gas generated by combustion in the combustion step. Harmful compounds that have not been completely decomposed and removed may remain even after the above-described pyrolysis step (S3) and combustion step (S4), and the harmful compounds that have been partially decomposed may then be re-synthesized again as harmful compounds. Therefore, in order to prevent such re-synthesis, it is desirable to remove the energy required for the re-synthesis by cooling a combustion gas in which undecomposed harmful compounds may remain.

The cooling may be performed by a commonly used method, for example, a method using cooling water, and rapid cooling is preferred in order to maximally suppress re-synthesis.

Post-Treatment Step (S6)

The sludge treatment process according to an exemplary embodiment may further include a post-treatment step (S6) for removing trace amounts of harmful gas and acid gas that still remain after the above-described cooling step. For example, the sludge treatment process may further include a scrubbing step (S6-1) in which the combustion gas cooled in the cooling step is allowed to pass through a scrubber and/or a dust collection step (S6-2) in which the combustion gas cooled in the cooling step is allowed to pass through a dust collector. Any one of the scrubbing step (S6-1) and the dust collection step (S6-2) may be included, or both may be included.

Most harmful compounds may be removed through the post-treatment step.

The scrubber used in the scrubbing step (S6-1) may include at least one of an organic solvent scrubber for removing an organic gas and a base solution scrubber for removing an acid gas. The combustion gas may pass through the base solution scrubber after passing through the organic solvent scrubber. A toluene scrubber may be used as the organic solvent scrubber, and a sodium hydroxide scrubber may be used as the base solution scrubber. When the above-described scrubber is used, the effect of removing harmful compounds may be maximized.

The dust collector used in the dust collection step (S6-2) may include a bag filter and the like.

When both the scrubbing step (S6-1) and the dust collection step (S6-2) are included in the post-treatment step, the sequence is not particularly limited, and the cooled combustion gas is allowed to pass through the dust collector, and then pass through the scrubber, or the cooled combustion gas is allowed to pass through the scrubber, and then pass through the dust collector. From the viewpoint of removing harmful gases, it is more desirable to allow the combustion gas to first pass through the dust collector and then the scrubber.

The FIGURE is a schematic view of the sequence of the sludge treatment process according to an exemplary embodiment of the present disclosure. According to the FIGURE, after the particle diameter is adjusted by crushing the sludge, the pyrolysis step and the combustion step are performed, and then the post-treatment step is performed. The crushing step in the FIGURE may be replaced with a drying step capable of adjusting the particle diameter. In addition, a drying step may be added before or after the crushing step in the FIGURE, if necessary, or pyrolysis may occur with drying in the pyrolysis step without the drying step. It is desirable to create an inert atmosphere such as $N_2$ gas in the pyrolysis step, and air or oxygen may be introduced in the combustion step. A carrier gas such as $N_2$ gas may be introduced directly into a pyrolysis apparatus, or may be introduced into a path through which a sample is introduced into the pyrolysis apparatus. The air or oxygen used in the combustion step may be introduced directly into a combustion apparatus, and may be introduced into a path through which the gas generated by the pyrolysis apparatus moves to the combustion apparatus, that is, between the pyrolysis apparatus and the combustion apparatus. Although not shown in the drawing, a step of cooling the combustion gas discharged in the combustion step may be additionally included.

The pyrolysis apparatus is an apparatus in which sludge is injected and the injected sludge is pyrolyzed by the heat transferred while moving from one end to the other end. The pyrolysis apparatus is a continuous pyrolysis apparatus in which a certain amount of sludge is continuously injected and a certain amount of pyrolyzed and detoxified samples are continuously discharged, or a batch-type pyrolysis apparatus in which characteristic sludge is injected and the pyrolysis apparatus is driven until all the injected sludge is discharged.

The pyrolysis apparatus may be a rotary furnace reactor, i.e., a rotary kiln.

In an example, the rotary furnace reactor may include a main body that pyrolyzes sludge to produce by-product gas and pyrolyzed sludge particles, a sludge supply unit that supplies the sludge in the form of particles into the main body, a gas supply unit to which a supply gas is supplied, a by-product gas discharge unit that discharges by-product gas produced by pyrolysis of the sludge, a sample discharge unit that discharges the pyrolyzed sludge particles produced by pyrolysis of the sludge, and multiple heating units located on the outer perimeter surface of the main body to transfer heat to the main body.

The higher the moisture content of the sludge injected into the pyrolysis apparatus, the longer the time the sludge resides in the pyrolysis apparatus, so that drying and pyrolysis may be allowed to occur together in the pyrolysis apparatus.

When the moisture content of the sludge injected into the pyrolysis apparatus is 20 wt % or more and 55 wt % or less, 30 wt % or more and 55 wt % or less, 40 wt % or more and 55 wt % or less, or 50 wt % or more and 55 wt % or less, the time for the sludge to reside in the pyrolysis apparatus may be adjusted to 6 hours or more and 48 hours or less, 12 hours or more and 48 hours or less, 18 hours or more and 48 hours or less, or 24 hours or more and 48 hours or less.

In this case, as for the time for the sludge to reside in the pyrolysis apparatus, when the speed at which the sludge moves from one end to the other end of the main body is constant, the time for the sludge to reside may be adjusted by the length of the main body. In this case, the length (L) of the main body is 1 m (meter) or more and 10 m (meter) or less, and the length of the main body may be selected according to the target time.

In this case, the length of the main body may be determined by the moisture content of the sludge injected into the pyrolysis apparatus, and specifically, the higher the moisture content of the sludge injected into the pyrolysis apparatus, the longer the length of the main body may become. For example, the length of the main body may be 30 cm or more and 1 m or less when the moisture content of the sludge injected into the pyrolysis apparatus is 5 wt % or less, the length of the main body may be 30 cm or more and 5 m or less when the moisture content of the sludge injected into the pyrolysis apparatus is 5 wt % or more and 30 wt % or less, and the length of the main body may be 30 cm or more and 10 m or less when the moisture content of the sludge injected into the pyrolysis apparatus is 30 wt % or more.

The main body is characterized by a ratio of diameter (d) to length (L) of 1:8 to 1:20. When the above-described range is satisfied, the supplied sludge smoothly moves in the width direction of the main body and heat may be supplied. The pyrolysis efficiency is high by efficiently using energy introduced.

Here, the length of the main body means the longest length in the axial direction of the main body, and the diameter of the main body means the longest length in the direction perpendicular to the axial direction of the main body.

The sludge supply unit is configured to receive the supply of mixed sludge particles and supply the mixed sludge particles into the main body, and may be provided on the side surface of the main body.

In an example, the sludge supply unit may include a hopper to which sludge is supplied and a moving unit that moves the sludge into the main body.

The hopper may be provided to be coupled with one side of the moving unit. The hopper may include a form in which the hopper becomes gradually narrower as it goes in a direction brought into contact with the moving unit, but the form is not limited as long as the sludge can be supplied.

Therefore, the moving unit may include one or more screws inside the main body that determines the outer shape of the moving unit. Here, the screw may include a form in which a blade is provided on the outer perimeter surface of a rotating body. Alternatively, the moving unit may include a conveyor belt inside the main body. However, the moving unit is not limited in its form as long as the moving unit can allow the sludge to move in a direction parallel to the rotation axis.

The sludge supply unit may further include an adjusting unit that adjusts the amount of sludge supplied. The adjusting unit may include one or more valves. Here, the valve may include a gate valve, a butterfly valve, a rotary valve, and the like. However, the adjusting unit is not limited in its form as long as the amount of sludge supplied can be adjusted.

The gas supply unit is configured to supply the supply gas into a rotary furnace reactor and adjust the supply gas with an air, low-oxygen or oxygen-free atmosphere. Here, the oxygen-free atmosphere includes an atmosphere in which the oxygen concentration is 0 vol %, and the low-oxygen atmosphere includes an atmosphere in which the oxygen concentration is 21 vol % or less. For example, the oxygen-free or low-oxygen atmosphere may include a nitrogen atmosphere, an inert atmosphere and a vacuum atmosphere.

The gas supply unit may be located on the outer perimeter surface of the main body, and furthermore, the gas supply unit may be formed on the outer perimeter surface of the main body in which the heating unit is not formed.

The by-product gas discharge unit may be formed in a direction facing the gas supply unit in order to increase the pyrolysis time of the sludge. Here, the facing direction means a direction facing each other with respect to a direction perpendicular to the axial direction of the rotary furnace reactor.

Furthermore, when the by-product gas is discharged through the by-product gas discharge unit, the supply gas may be discharged together with the by-product gas.

The sample discharge unit may be formed on the outer perimeter surface of the main body in which the heating unit is not formed. The sludge supply unit may be located at one end of the main body, and the sample discharge unit may be located at the other end of the main body. Alternatively, the sample discharge unit may be formed in a direction facing the sludge supply unit with respect to the length direction of the rotary furnace reactor.

In the rotary furnace reactor according to the present disclosure, each heating unit may be located on the outer surface of the main body to apply the same heat or the temperature in each temperature section may be adjusted so as to be different from each other.

Mode for Invention

Hereinafter, the present disclosure will be described in more detail with reference to Examples and Experimental Examples in order to specifically describe the present disclosure, but the present disclosure is not limited by these Examples and Experimental Examples. The Examples according to the present disclosure may be modified in various forms, and it should not be interpreted that the scope of the present disclosure is limited to the Examples to be described in detail below. The Examples of the present disclosure are provided for more completely explaining the present disclosure to a person with ordinary skill in the art.

1. Examples 1 and 2

Sample Preparation and Pre-Treatment Process

A sample having a moisture content of about 55 wt % was prepared by dehydrating a liquid sludge including a chlorine-based material. The initial toxicity concentration of the sample was 96,000 pg I-TEQ/g.

The sample had a firmly hardened soil-like shape, and the weight ratio of organic material and inorganic material was almost 1:1, which is at an almost similar level.

The sample was dehydrated, and then pulverized such that the particle diameter was as shown in the following Table 1. Subsequently, the sample was dried such that the moisture content was less than 5 wt %.

Pyrolysis Process And Subsequent Processes

The temperature of a combustion apparatus was increased to a target temperature of 1100° C. After 10 g of the pre-treated sample was put into a crucible, the crucible was introduced into a pyrolysis apparatus. Subsequently, an oxygen-free atmosphere was created by purging the pyrolysis apparatus with $N_2$ for 1 hour or more. Subsequently, the temperature of the pyrolysis apparatus was increased to 350° C. for 1 hour, and simultaneously, air was introduced between the pyrolysis apparatus and the combustion apparatus. Pyrolysis was performed in the pyrolysis apparatus for 2 hours, and the discharged pyrolysis gas was allowed to move to a combustion apparatus (1100° C., heated in advance before the start), so that the pyrolysis gas could be burnt at high temperature together with the air. After an exhaust gas generated after the pyrolysis and combustion was allowed to pass through a cooling apparatus, the exhaust gas was allowed to pass through a scrubber (toluene and NaOH), and then discharged to the outside. After toluene and NaOH were concentrated in the scrubber, a chlorine compound was extracted (including separation and purification), and a toxicity concentration was confirmed by high resolution-gas chromatography mass spectrometry (HR-GCMS).

2. Example 3

A sample having a moisture content of about 55 wt % was prepared by dehydrating a liquid sludge including a chlorine-based material. The initial toxicity concentration of the sample was 96,000 pg I-TEQ/g.

The sample had a firmly hardened soil-like shape, and the weight ratio of organic material and inorganic material was almost 1:1, which is at an almost similar level.

After the sample was pulverized, the particle diameter was adjusted to 45 mm or less. In this case, the moisture content was about 50 to 55 wt %.

Such sludge was pyrolyzed by a rotary kiln with a main body length of 1 m, the speed of a rotary furnace was adjusted to 20 Hz, and the residence time was maintained at an isothermal temperature for 24 hours after the temperature reached a target temperature. In this case, the ratio of diameter (d) and length (L) was 1:8 in the main body of the rotary kiln. As for other conditions, the pyrolysis process of Example 3 and subsequent processes were performed based on the above-described pyrolysis processes of Examples 1 and 2 and the subsequent processes.

As a result of performing the processes as described above, the toxicity removal rate is shown in the following Table 1. The residual toxicity was confirmed in a waste solid remaining after pyrolysis, the residual toxicity was confirmed in the gas discharged after combustion, and the residual toxicity was evaluated based on the entire system using the confirmed residual toxicities. Specifically, the toxicity concentration of the entire system was calculated by adding up the solid residual toxicity concentration and the gas residual toxicity concentration, and the toxicity removal rate was calculated based on the initial toxicity concentration of 96,000 pg I-TEQ/g.

TABLE 1

| | | Pyrolysis (atmosphere $N_2$, temperature 350° C., 4 hr) | | Combustion (air, temperature 1,100° C.) | | |
|---|---|---|---|---|---|---|
| | | Waste solid | Waste solid | Exhaust gas | Entire system | |
| Experiment No. | Particle size (mm) | toxicity concentration (pg I-TEQ/g) | toxicity removal rate (%) | toxicity concentration (pg I-TEQ/g) | Toxicity concentration (pg I-TEQ/g) | Toxicity removal rate (%) |
| Example 1 | 4 to 6 | 484 | 99.5 | 7760 | 8244 | 91.4 |
| Example 2 | 6 to 45 | 405 | 99.6 | 7240 | 7645 | 92.0 |
| Example 3 | 6 to 45 | 401 | 99.5 | 7310 | 7711 | 92.0 |
| Comparative Example 1 | >45 | 2210 | 97.7 | 10060 | 12270 | 87.2 |
| Comparative Example 2 | <2 | 815 | 99.2 | 7820 | 8635 | 91.0 |

As shown in Table 1, the examples, in which the particle diameter of sludge was adjusted to more than 2 mm and 45 mm or less, exhibited excellent toxicity removal rate because the toxicity removal rate of the entire system was more than 91% compared to that of Comparative Example 1 in which the particle diameter of sludge was adjusted to more than 45 mm Examples 1 to 3 exhibited similar or comparable levels of toxicity removal rates when compared to Comparative Example 2 in which the particle diameter of sludge was adjusted to less than 2 mm. In this case, in Example 3, the pyrolysis process was performed for sludge having a moisture content of about 50 to 55 wt % without a separate drying step, thereby exhibiting a toxicity removing effect similar to Examples 1 and 2 in which after drying, sludge having a moisture content of less than 5 wt % was pyrolyzed.

In this regard, in the present disclosure, when the particle diameter of sludge is adjusted, the time and energy required for the crushing or pulverizing and classification processes may be saved by setting the reference for the upper limit of the particle diameter to 45 mm. Furthermore, by setting the reference for the upper limit of sludge particle diameter to 45 mm, the generation amount of fine particles that may cause dust may be reduced, thereby preventing dust to reduce the time and cost for maintaining the working environment and maintaining and repairing the equipment.

The invention claimed is:

1. A sludge treatment process comprising:

adjusting a sludge comprising chlorine components at a concentration of 1,000 ppm to 20,000 ppm, wherein the adjusting of the sludge comprises drying the sludge to have a moisture content of 5 wt % or less, wherein the adjusting of the sludge further comprises a classification step of separating particles having a particle diameter of more than 11 mm to 45 mm or less, and wherein the adjusted sludge comprises particles having a particle diameter of more than 11 mm to 45 mm or less;

pyrolyzing the adjusted sludge in a low-oxygen or oxygen-free atmosphere and at a temperature of 350° C. to 500° C., wherein the low-oxygen atmosphere comprises an atmosphere in which the oxygen concentration is in a range of 21 vol % or less; and combusting a gas generated in the pyrolysis of the adjusted sludge.

2. The sludge treatment process of claim 1, wherein the adjusting of the sludge comprises crushing the sludge.

3. The sludge treatment process of claim 1, wherein the adjusting of the sludge comprises crushing or pulverizing the sludge before, during, or after the drying of the sludge.

4. The sludge treatment process of claim 1, further comprising dehydrating the sludge before the adjusting of the sludge.

5. The sludge treatment process of claim 4, wherein the sludge is dehydrated to have a moisture content of 30 wt % to 70 wt %.

6. The sludge treatment process of claim 1, further comprising drying the sludge before or after the adjusting of the sludge.

7. The sludge treatment process of claim 1, wherein the pyrolyzing is performed in an atmosphere with an oxygen concentration of 3 vol % or less.

8. The sludge treatment process of claim 1, wherein the pyrolyzing is performed for 1 hour to 6 hours.

9. The sludge treatment process of claim 1, wherein the combusting is performed at a temperature of 900° C. to 1,200° C.

10. The sludge treatment process of claim 1, further comprising cooling a combustion gas generated after the combusting.

11. The sludge treatment process of claim 10, further comprising:

at least one of passing the cooled combustion gas through a scrubber or passing the cooled combustion gas through a dust collector.

* * * * *